(12) United States Patent
Scalf et al.

(10) Patent No.: US 10,941,978 B2
(45) Date of Patent: Mar. 9, 2021

(54) REFRIGERATOR FLUID DISPENSER WITH DISPENSED VOLUME CALCULATION

(71) Applicant: Midea Group Co., Ltd., Foshan (CN)

(72) Inventors: Eric Scalf, Louisville, KY (US); Robert M. Digman, Goshen, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 233 days.

(21) Appl. No.: 16/214,866

(22) Filed: Dec. 10, 2018

(65) Prior Publication Data

US 2020/0182534 A1 Jun. 11, 2020

(51) Int. Cl.
*F25D 23/12* (2006.01)
*F25C 5/20* (2018.01)
*G01F 1/00* (2006.01)

(52) U.S. Cl.
CPC .............. *F25D 23/126* (2013.01); *F25C 5/22* (2018.01); *G01F 1/007* (2013.01); *F25C 2600/04* (2013.01); *F25D 2323/121* (2013.01); *F25D 2323/122* (2013.01); *F25D 2400/361* (2013.01)

(58) Field of Classification Search
CPC .............. F25F 23/126; F25D 2323/122; F25D 2323/121
See application file for complete search history.

(56) References Cited

U.S. PATENT DOCUMENTS

| | | | |
|---|---|---|---|
| 4,027,499 A | 6/1977 | Barto et al. | |
| 4,987,746 A | 1/1991 | Roberts | |
| 5,819,547 A | 10/1998 | Oh | |
| 7,201,005 B2 | 4/2007 | Voglewede et al. | |
| 7,210,601 B2 | 5/2007 | Hortin et al. | |
| 7,475,555 B2 | 1/2009 | Janardhanam et al. | |
| 7,869,901 B2 | 1/2011 | Johnson et al. | |
| 8,011,537 B2 | 9/2011 | Muthumani et al. | |
| 8,025,186 B2 | 9/2011 | Lee et al. | |

(Continued)

FOREIGN PATENT DOCUMENTS

| CN | 102374742 A | 3/2012 |
|---|---|---|
| CN | 103277972 A | 9/2013 |

(Continued)

OTHER PUBLICATIONS

Daniel DiClerico, Refrigerator Water Dispensers Pour on the Innovation, www.consumerreports.org, Feb. 9, 2017.

(Continued)

*Primary Examiner* — Nelson J Nieves (74) *Attorney, Agent, or Firm* — Middleton Reutlinger (57) ABSTRACT

A refrigerator and method utilize first and second sensors to determine a volume of fluid dispensed by a fluid dispenser that incorporates a fluid storage receptacle. The first sensor is disposed in upstream fluid communication with the fluid storage receptacle to generate a first signal representative of a volume of fluid entering the fluid storage receptacle and the second sensor is disposed downstream of the first sensor to generate a second signal representative of a volume of fluid exiting the fluid storage receptacle, and a controller determines the volume of fluid dispensed using the first and second signals output by the first and second sensors.

25 Claims, 6 Drawing Sheets

(56) References Cited

U.S. PATENT DOCUMENTS

| | | | | |
|---|---|---|---|---|
| 8,123,075 B2* | 2/2012 | Kadyk | | A23G 9/045 |
| | | | | 222/64 |
| 8,245,735 B2 | 8/2012 | Chase et al. | | |
| 8,443,614 B2 | 5/2013 | Kim | | |
| 8,935,935 B2 | 1/2015 | Waugh et al. | | |
| 9,297,574 B2 | 3/2016 | Lee et al. | | |
| 10,345,033 B1* | 7/2019 | Thomas | | F25D 23/126 |
| 2004/0007516 A1* | 1/2004 | Fritze | | C02F 9/005 |
| | | | | 210/263 |
| 2005/0178273 A1* | 8/2005 | Meuleners | | B67D 1/0858 |
| | | | | 99/279 |
| 2005/0268639 A1* | 12/2005 | Hortin | | B67D 1/0009 |
| | | | | 62/389 |
| 2006/0196212 A1 | 9/2006 | Jenkins, Jr. et al. | | |
| 2007/0251261 A1* | 11/2007 | Son | | F25D 23/126 |
| | | | | 62/390 |
| 2009/0159611 A1* | 6/2009 | Roetker | | B67D 1/0858 |
| | | | | 222/1 |
| 2009/0165494 A1* | 7/2009 | Muthumani | | B67D 1/001 |
| | | | | 62/390 |
| 2014/0157810 A1 | 6/2014 | Jang | | |
| 2014/0242219 A1* | 8/2014 | Cho | | B01F 3/04787 |
| | | | | 426/67 |
| 2015/0083251 A1* | 3/2015 | Orita | | B67D 3/0022 |
| | | | | 137/574 |
| 2015/0144651 A1* | 5/2015 | Berger | | B67D 1/0858 |
| | | | | 222/1 |
| 2016/0003523 A1* | 1/2016 | Kim | | B01F 15/00155 |
| | | | | 222/146.6 |
| 2016/0083241 A1* | 3/2016 | Koo | | F25D 23/126 |
| | | | | 222/1 |
| 2016/0223251 A1* | 8/2016 | Yun | | B67D 1/0014 |
| 2016/0290710 A1* | 10/2016 | Lee | | F25D 29/005 |
| 2017/0137277 A1 | 5/2017 | Comsa et al. | | |
| 2017/0152132 A1 | 6/2017 | Laible | | |
| 2017/0241700 A1* | 8/2017 | Mitchell | | F25D 17/065 |
| 2017/0245675 A1* | 8/2017 | Junge | | A47J 31/401 |
| 2017/0297891 A1* | 10/2017 | Ko | | F25D 23/126 |
| 2018/0045442 A1* | 2/2018 | Park | | F25B 1/005 |
| 2018/0187964 A1 | 7/2018 | Park et al. | | |
| 2018/0335248 A1* | 11/2018 | Root | | F25C 5/22 |
| 2019/0316793 A1* | 10/2019 | Ho | | F24F 3/12 |
| 2019/0383543 A1* | 12/2019 | Chandra | | F25D 23/126 |
| 2020/0029725 A1* | 1/2020 | Wantland | | F25D 23/028 |
| 2020/0093320 A1* | 3/2020 | Thomas | | F25D 23/12 |

FOREIGN PATENT DOCUMENTS

| | | | | |
|---|---|---|---|---|
| CN | 103486812 A | 1/2014 | | |
| CN | 103994624 A | 8/2014 | | |
| CN | 104075533 A | 10/2014 | | |
| CN | 104180583 A | 12/2014 | | |
| CN | 206600975 U | 10/2017 | | |
| EP | 2905565 A1 | 8/2015 | | |
| WO | WO-9015012 A1 * | 12/1990 | | B67D 3/0003 |
| WO | WO-2013150935 A1 * | 10/2013 | | B67D 7/78 |

OTHER PUBLICATIONS

International Search Report and Written Opinion issued in Application No. PCT/CN2019/094320 dated Sep. 20, 2019.

* cited by examiner

REFRIGERATOR FLUID DISPENSER WITH DISPENSED VOLUME CALCULATION

BACKGROUND

Many residential refrigerators include as a convenience feature an integrated dispenser for dispensing a fluid, e.g., water. In addition, some refrigerators incorporate a water tank or other fluid storage receptacle that may be fixed or removable, and positioned within a cooled compartment of the refrigerator to cool the contained water prior to dispensing or otherwise serving (e.g., in the case where the receptacle is removable). In addition, some refrigerators include flow sensors such as flow meters to measure the volume of water dispensed, generally to display to the user the amount of water being dispensed into a container. Further, in some designs the measurement of the amount of dispensed water can be used to enable a user to select a desired amount of water and have the dispenser automatically shut off when that desired amount has been reached. A need still exists, however, for a manner of accurately measuring the volume of dispensed water, particularly in applications where a dispenser incorporates fluid storage receptacle.

SUMMARY

The herein-described embodiments address these and other problems associated with the art by providing a refrigerator and method that utilize first and second sensors to determine a volume of fluid dispensed by a fluid dispenser that incorporates a fluid storage receptacle. The first sensor is disposed in upstream fluid communication with the fluid storage receptacle to generate a first signal representative of a volume of fluid entering the fluid storage receptacle and the second sensor is disposed downstream of the first sensor to generate a second signal representative of a volume of fluid exiting the fluid storage receptacle, and a controller determines the volume of fluid dispensed using the first and second signals output by the first and second sensors.

Therefore, consistent with one aspect of the invention, a refrigerator may include a housing including a freezer compartment and a fresh food compartment, one or more doors attached to the housing to provide access to the freezer and fresh food compartments, a water storage receptacle having an inlet and an outlet, a receptacle fill valve in upstream fluid communication with the inlet of the water storage receptacle to control a flow of water into the water storage receptacle, a dispensing valve in downstream fluid communication with the outlet of the water storage receptacle to control dispensing of water from the water storage receptacle, a flowmeter in upstream fluid communication with the inlet of the water storage receptacle to generate a first signal representative of a volume of water entering the water storage receptacle, a water level sensor positioned to generate a second signal representative of a level of water in the water storage receptacle, and a controller coupled to the dispensing valve, the flowmeter, and the water level sensor and configured to control the dispensing valve to dispense water from the water storage receptacle and to determine a volume of water dispensed through the dispensing valve using the first and second signals.

Consistent with another aspect of the invention, a refrigerator may include a housing defining at least one food compartment, at least one door attached to the housing, a fluid storage receptacle having an inlet and an outlet, a dispensing valve in downstream fluid communication with the outlet of the fluid storage receptacle to control dispensing of fluid from the fluid storage receptacle, a first sensor in upstream fluid communication with the inlet of the fluid storage receptacle to generate a first signal representative of a volume of fluid entering the fluid storage receptacle, a second sensor disposed downstream of the first sensor to generate a second signal representative of a volume of fluid exiting the outlet of the fluid storage receptacle, and a controller coupled to the dispensing valve, the first sensor, and the second sensor and configured to control the dispensing valve to dispense fluid from the fluid storage receptacle and to determine a volume of fluid dispensed through the dispensing valve using the first and second signals.

In some embodiments, the first sensor includes a flowmeter. Also, in some embodiments, the flowmeter is integrated with a receptacle fill valve in upstream fluid communication with the inlet of the fluid storage receptacle to control a flow of fluid into the fluid storage receptacle. Further, in some embodiments, the second sensor includes a fluid level sensor positioned to sense a level of fluid in the fluid storage receptacle. In some embodiments, the fluid level sensor includes an ultrasonic sensor positioned to detect a distance to a fluid surface in the fluid storage receptacle or a conductivity sensor disposed on a wall of the fluid storage container. In addition, some embodiments may also include a receptacle fill valve in upstream fluid communication with the inlet of the fluid storage receptacle to control a flow of fluid into the fluid storage receptacle.

In some embodiments, the controller is configured to determine the volume of fluid dispensed through the dispensing valve at least in part by determining a change in fluid level in the fluid storage receptacle using the second signal. In addition, in some embodiments, the controller is configured to determine the volume of fluid dispensed through the dispensing valve at least in part by determining a volume of fluid entering the fluid storage receptacle using the first signal. Moreover, in some embodiments, the controller is configured to determine the volume of fluid dispensed through the dispensing valve using the formula: $VOUT=VIN+V\Delta LEVEL$, where $VOUT$ is the volume of fluid dispensed, $VIN$ is the volume of fluid entering the fluid storage receptacle, and $V\Delta LEVEL$ is the volume of fluid corresponding to the change in fluid level in the fluid storage receptacle.

In some embodiments, the controller is configured to accumulate the volume of fluid dispensed over a plurality of polling intervals when the dispensing valve is actuated to dispense fluid from the fluid storage receptacle. Moreover, in some embodiments, the fluid storage receptacle is vented. In some embodiments, the controller is further configured to cause the determined volume of water dispensed through the dispensing valve to be displayed on a display disposed on one of the housing and the at least one door. In addition, in some embodiments, the controller is further configured to control the dispensing valve to discontinue dispensing fluid when the determined volume of water dispensed through the dispensing valve reaches a predetermined volume.

In some embodiments, the controller is configured to set the predetermined volume in response to user input. In addition, some embodiments may further include a fluid dispensing control disposed on one of the housing and the at least one door, where the controller is configured to control the dispensing valve responsive to user input received by the fluid dispensing control.

Consistent with another aspect of the invention, a refrigerator may include a housing including a freezer compartment and a fresh food compartment, one or more doors attached to the housing to provide access to the freezer and fresh food compartments, a water storage receptacle having an inlet and an outlet, where the inlet is in fluid communication with a water supply, a dispensing valve in downstream fluid communication with the outlet of the water storage receptacle to control dispensing of water from the water storage receptacle, a water level sensor positioned to generate a signal representative of a level of water in the water storage receptacle, and a controller coupled to the dispensing valve and the water level sensor and configured to control the dispensing valve to dispense water from the water storage receptacle and to determine a volume of water dispensed through the dispensing valve based at least in part upon the signal representative of the level of water generated by the water level sensor.

Consistent with another aspect of the invention, a method of dispensing water in a refrigerator may include actuating a dispensing valve in downstream fluid communication with an outlet of a water storage receptacle to control dispensing of water from the water storage receptacle, with a first sensor in upstream fluid communication with an inlet of the water storage receptacle, generating a first signal representative of a volume of water entering the water storage receptacle, with a second sensor disposed downstream of the first sensor, generating a second signal representative of a volume of water exiting the outlet of the water storage receptacle, and with a controller, determining a volume of water dispensed through the dispensing valve using the first and second signals.

Also, in some embodiments, the first sensor includes a flowmeter and the second sensor includes a water level sensor positioned to sense a level of water in the water storage receptacle. Some embodiments may also include selectively actuating a receptacle fill valve in upstream fluid communication with the inlet of the water storage receptacle to control a flow of water into the water storage receptacle in response to determining from the second sensor that a water level in the water storage receptacle is below a fill threshold. In addition, in some embodiments, determining the volume of water dispensed through the dispensing valve includes determining a change in water level in the water storage receptacle using the second signal, determining a volume of water entering the water storage receptacle using the first signal, and determining the volume of water dispensed through the dispensing valve using the determined change in water level in the water storage receptacle and the determined volume of water entering the water storage receptacle.

Also, in some embodiments, determining the volume of water dispensed through the dispensing valve further includes accumulating the volume of water dispensed over a plurality of polling intervals when the dispensing valve is actuated to dispense water from the water storage receptacle. In addition, some embodiments may further include displaying the determined volume of water dispensed through the dispensing valve on a display disposed on one of a housing and a door of the refrigerator. Some embodiments may further include controlling the dispensing valve to discontinue dispensing fluid when the determined volume of water dispensed through the dispensing valve reaches a predetermined volume. Also, in some embodiments, determining the volume of water dispensed through the dispensing valve using the first and second signals includes determining the volume of water dispensed after a volume of water exceeding a capacity of the fluid storage receptacle has been dispensed.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Embodiments consistent with the invention may utilize first and second sensors to determine a volume of fluid dispensed by a refrigerator fluid dispenser that incorporates a fluid storage receptacle. The first sensor, e.g., a flowmeter, may be disposed in upstream fluid communication with the fluid storage receptacle to generate a first signal representative of a volume of fluid entering the fluid storage receptacle. The second sensor, e.g., a fluid level sensor, may be disposed downstream of the first sensor to generate a second signal representative of a volume of fluid exiting the fluid storage receptacle. A controller may then determine the volume of fluid dispensed using the first and second signals output by the first and second sensors. Among other advantages that will become more apparently below, the use of multiple sensors enables an accurate determination of dispensed volume to be obtained even when the dispensed volume exceeds the capacity of the fluid storage receptacle.

Turning now to the Drawings, wherein like parts are denoted by like numbers throughout the several views, the embodiments discussed hereinafter will focus on an example implementation of the hereinafter-described techniques and apparatuses within a residential side-by-side refrigerator such as refrigerator 10 illustrated in FIGS. 1 and 2, such as the type that may be used in single-family or multi-family dwellings, or in other similar applications. However, it will be appreciated that the herein-described techniques and apparatuses may also be used in connection with other types of refrigerators in some embodiments. For example, the herein-described techniques may be used in commercial applications in some embodiments. Moreover, the herein-described techniques may be used in connection with various refrigerator configurations, e.g., within French door refrigerators, bottom freezer refrigerators, top freezer refrigerators, wine refrigerators and beverage centers, compact refrigerators, etc., so the embodiments are not limited to the side-by-side refrigerator implementation discussed further herein.

Refrigerator 10 as noted above is a side-by-side refrigerator, and as such includes a front-mounted door 12 and a cabinet or housing 14 that provides access to a freezer compartment 13 (FIG. 2) housed within cabinet or housing 14. Similarly an adjacent pivotable door 16 may provide access to a fresh-food compartment (not shown) and when in the open position, food and beverage items may be inserted into and removed from the fresh-food compartment. Door 12 is generally provided with a hinge 17 along a side or top edge of housing 14 and is pivotable between a closed position illustrated in FIGS. 1 and 2 and an open position (not shown). When door 12 is in an open position, food and beverage items may be inserted into and removed from freezer compartment 13 through door 12 or, alternatively, through an opening in door 12. Control over refrigerator 10 by a user is generally managed through a control panel 18, which can be disposed on a door such as door 12. Control panel 18 can also be disposed within the freezer or fresh-food compartment in another embodiment, or in multiple doors, and can be utilized with a user interface 19 for the refrigerator 10. It will be appreciated that in different refrigerator designs, control panel 18 may include various types of input and/or output devices, including various knobs, buttons, lights, switches, textual and/or graphical displays, touch screens, etc. through which a user may configure one or more settings, determine the status of a dispenser, start and/or stop a dispenser, set a flow rate and/or fill amount, etc.

Figure 1:
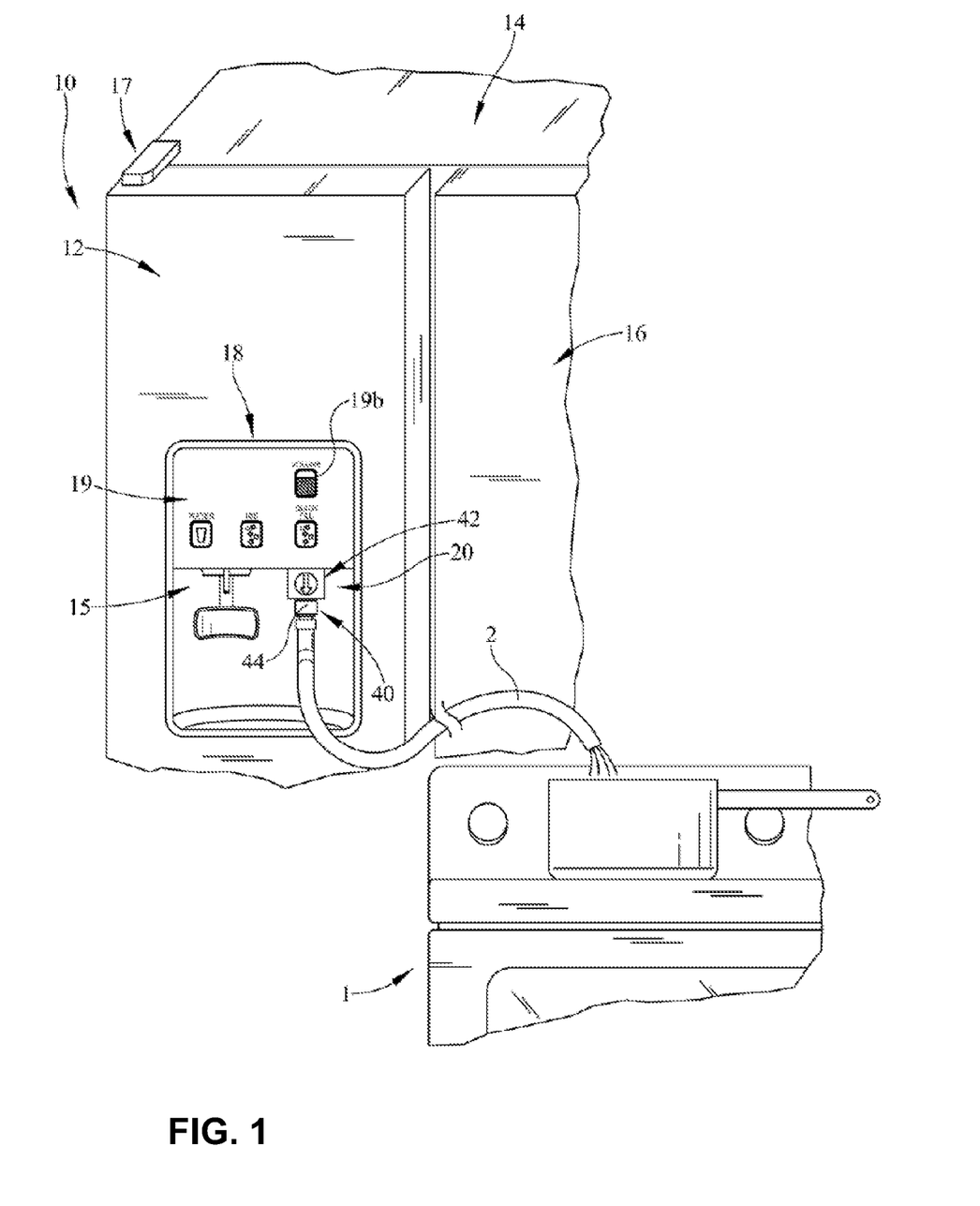
FIG. 1 is an enlarged front view of one embodiment of a refrigerator utilizing a quick fill water dispenser located near a cooking appliance, with portions of the refrigerator and cooking appliance broken away.
Figure 2:
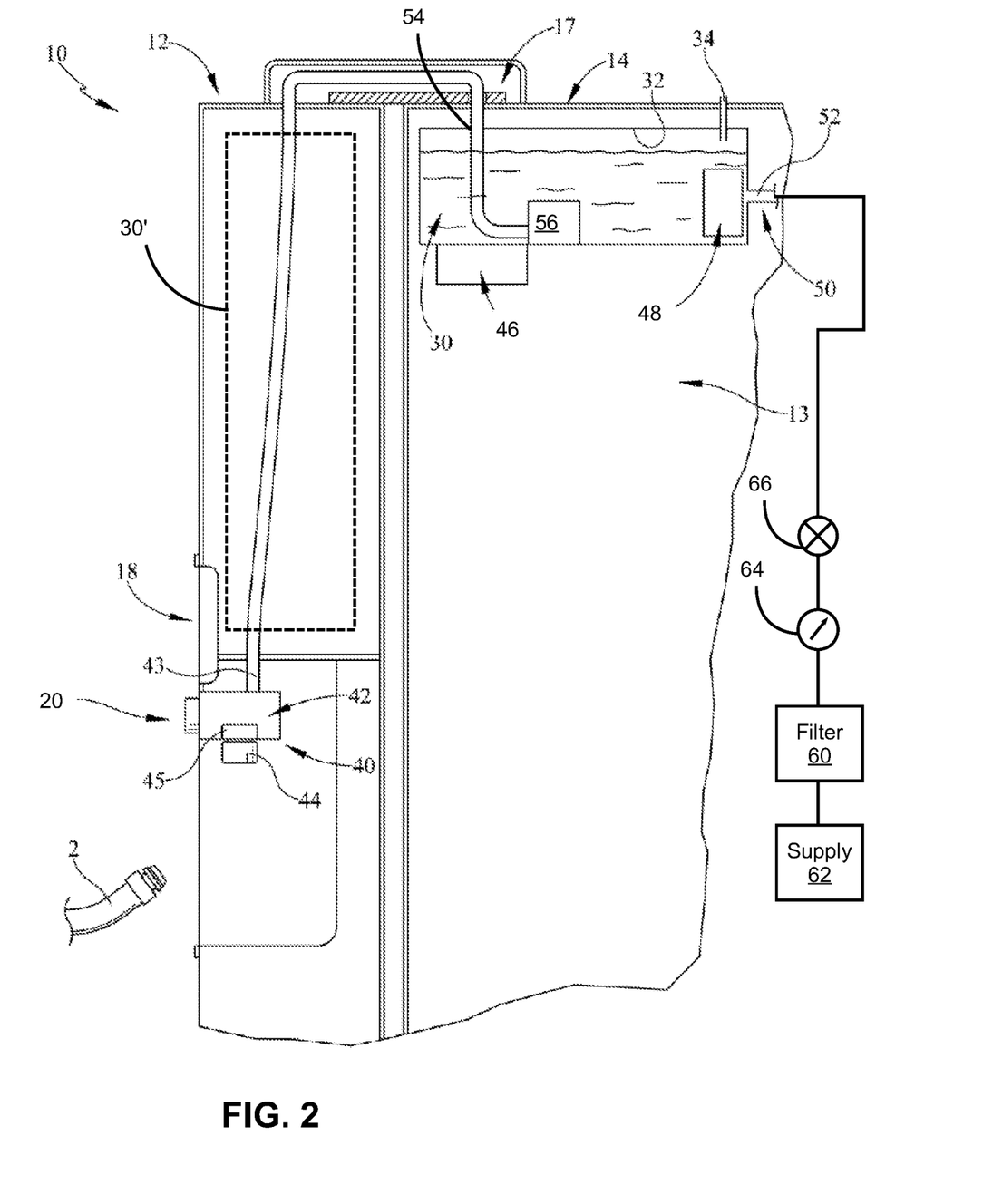
FIG. 2 is a schematic side view of one embodiment of the water dispenser in the refrigerator of FIG. 1, with portions of the refrigerator broken away.

As shown in FIGS. 1-2, refrigerator 10 may include a water dispenser 20, which in some embodiments may be a quick fill dispenser capable of dispensing water at a faster rate than provided through a residential water supply coupled to the refrigerator. Referring to FIG. 2, dispenser 20 may include at least one fluid storage receptacle, e.g., a water storage receptacle 30, positioned in the refrigerator. Water storage receptacle 30 quickly feeds one or more downstream outlets 40, as opposed to a more typical water dispenser that uses water pressure to dispense water and/or allows water to flow through a water filter 60 at a restricted flow rate associated with the water filter. Water storage receptacle 30 may be in a variety of locations and configurations within the refrigerator 10. More specifically, in some embodiments, the water storage receptacle 30 may be positioned in housing 14, or as illustrated via dashed lines at 30' in FIG. 2, in a door such as door 12. In some embodiments, the dispensed water exiting water storage receptacle 30 is in fluid communication with one or more downstream outlets 40, which may include at least one dispensing valve 42 that is positioned downstream of and/or at a lower elevation than at least a portion of water storage receptacle 30 to control a variety of flow rates and/or volumes of dispensed water. In some embodiments, dispensing valve 42 may be a variable valve to allow for varying flow rates, while in other embodiments, dispensing valve 42 may simply be an on-off valve. The water flow rate from water storage receptacle 30 and/or outlet 40 may be pumped, gravity dispensed, and/or pressurized, etc. to quickly dispense water from the refrigerator 10. A variety of flow rates may be used in some embodiments, as desired by the user. For example, in some embodiments the water flow rate may be in the range of about 1 gallon per minute to about 2 gallons per minute. Moreover, the flow rates may be adjustable as noted above.

In addition, in some embodiments, a second dispenser 15 may also be provided in refrigerator 10, e.g., for dispensing ice produced by an icemaker within door 12 or housing 14. In some embodiments, second dispenser 15 may also be capable of dispensing water, e.g., to provide water for drinking glasses/cups at a lower flow rate than provided by dispenser 20. In other embodiments, separate ice and water dispensers may be provided in addition to quick fill dispenser 20, while in other embodiments, no ice dispenser may be provided. In still other embodiments, dispenser 20 may be capable of both quick fill and standard rate water dispensing, whereby no separate standard rate water dispenser may be used.

Moreover, it will be appreciated that the techniques discussed hereinafter may be used in connection with other types of fluid dispensers, including standard flow rate water dispensers, coffee dispensers, beverage dispensers, hot water dispensers, quick fill dispensers for non-water fluids, etc., so the invention is not limited to use with the quick fill water dispenser discussed herein.

As mentioned above, water storage receptacle 30, or portions thereof, may be located within refrigerator 10 in a variety of locations. In some embodiments, a water storage receptacle, or portions thereof, may be positioned in a door, e.g., as represented at 30' in FIG. 2. In such embodiments, a water supply line may be routed, for example, from housing 14 into door 12, e.g., adjacent door hinge 17. In some embodiments, a hose connection (not shown) may be used between door 12 and housing 14 to allow the one or more doors 12 to be removable.

Alternatively, as illustrated in FIG. 2, water storage receptacle 30 may be positioned in refrigerator housing 14, e.g., proximate a top of housing 14. In the illustrated embodiment, quick fill dispenser 20 may include an outlet hose 43 extending from an outlet 54 of water storage receptacle 30 through hinge 17 to a dispenser exit or outlet 40 of door 12. Dispenser 20 may also, in some embodiments, include a pump 56 in fluid communication with water storage receptacle 30 and outlet 40. It should be understood that other methods may be used to dispense water from water storage receptacle 30 (e.g. pressure and/or gravity). Moreover, in some embodiments, a bladder or conduit may be used for water storage receptacle in the housing 14.

In some embodiments, dispenser 20 may also include a hot/cold plate 46 to heat and/or cool the water storage receptacle's water within. If used, hot/cold plate 46 may be positioned adjacent water storage receptacle 30 to allow a user to set the temperature of the water therein. The temperature may also be displayed on control panel 18 in some embodiments. User interface 19 may also allow the user to select the desired temperature of the water within water storage receptacle 30.

In addition, in some embodiments, outlet 40 of dispenser 20 may include one or more couplings 44 to releasably secure one or more downstream attachments 2. As shown in FIGS. 1-2, dispensing valve 42 and/or outlet 40 may include a coupling 44 (e.g. hose quick connector and/or garden hose thread feature) to allow an additional downstream attachment 2 (e.g. second hose, extension, or accessory). In some embodiments, attachment 2 may be added as an extension to increase the distance the dispensed water may be discharged from refrigerator 10 to a container or dispensing target area. For example, attachment 2 may be used to fill a pot or container on an adjacent range 1 as shown in FIG. 1, a coffee maker on the kitchen counter, a large pitcher, a coffee carafe, etc.

In addition, in various embodiments, dispenser 20 may include one or more sensors 48 to monitor characteristics of the water in the water storage receptacle 30 (e.g. tank 32). Characteristics of the water may include, but are not limited to, status (e.g. full, empty, refill, ready to dispense, etc.), temperature, water level or volume, duration to fill, flow rate, etc. Sensor 48 may include electronic and/or mechanical devices used to monitor dispenser 20 and/or water therein, such as but not limited to a float, laser eye, water level switch, ultrasonic sensor, conductivity sensor, weight sensor (e.g. load cell), flow sensor (e.g. flowmeter), optical sensor, temperature sensor (e.g. infrared sensor, wired or wireless contact sensor), timer, wired or wireless sensors, etc. In various embodiments, a light or fill gage 19b or other indicators may be used in user interface 19 to highlight the feature and communicate when dispenser 20 is available.

In some embodiments, for example, the one or more sensors 48 may include a water level sensor positioned and suitable for sensing a height or elevation of water in water storage receptacle 30, such a sensor may use a float, a conductivity, capacitive or resistive sensor mounted to a wall of water storage receptacle 30, an ultrasonic sensor positioned above the receptacle to detect a distance to the water surface, or other sensor designs suitable for sensing a level of water in the receptacle. Then, based upon a known geometry of the receptacle, a current volume of water in the receptacle may be determined. The water level sensor may generate a signal that is communicated to a controller to enable the controller to determine a water level in the receptacle, as well as to determine a change in water level, and thus volume, over time.

Water storage receptacle 30 may also include an inlet 50 and an outlet 54. Inlet 50 may be coupled to an upstream supply line 52, and in some embodiments, supply line 52 may be coupled to a water supply 62 through a filter 60, a sensor 64 and a receptacle fill valve 66. Filter 60 may be disposed in various locations in refrigerator 10, and in many instances is oriented in a location that enables the filter to be replaced by a user periodically. Sensor 64 is in upstream fluid communication with inlet 50 of water storage receptacle 30 to sense a volume of water entering water storage receptacle 30 and generate therefrom a signal representative of this volume, which may in turn be communicated to a controller to enable the controller to determine a flow rate through the supply line, and thus a volume of water entering the receptacle. In some embodiments, sensor 64 may be a flowmeter, although other sensors suitable for measuring a volume or flow of water into a receptacle may be used in the alternative.

Receptacle fill valve 66 is also in upstream fluid communication with inlet 50 of water storage receptacle 30 to regulate or control the flow of water into the receptacle. In some embodiments, valve 66 may be controlled by a controller, e.g., in response to a water level sensed by sensor 48, while in other embodiments, valve 66 may be controlled independently of a controller, e.g., based upon a microswitch coupled to a float that is triggered when the water level falls below a predetermined water level.

It will be appreciated that a water level sensor or other sensor may additionally be used to determine a volume of water exiting outlet 54 of water storage receptacle 30. Such a sensor may be downstream of sensor 66, and moreover, may be disposed within water storage receptacle 30 in some embodiments (as would be the case with some water level sensors such as conductivity sensors), positioned proximate to or within water storage receptacle 30 to detect a surface of the water in some embodiments (as would be the case with some water level sensors such as ultrasonic sensors), disposed downstream of or within outlet 54 in other embodiments (as would be the case with a flowmeter), or in other suitable positions to generate a signal from which the volume of water exiting the receptacle can be determined.

In some embodiments, dispenser outlet 40 may be configured to adjust the flow rate (e.g. gravity flow rate) of water exiting water storage receptacle 30, and may include a hose or conduit 43, laminar flow device 45, and/or dispensing valve 42 to allow water to flow out of dispenser 20. The size of hose 43 may be adjusted to increase/decrease the water flow rate (e.g. similar to the water output of a kitchen faucet). Laminar flow device 45, if used, may be a variety of devices to control the water flow characteristics (e.g. an aerator). Dispensing valve 42 may be connected to the end of hose 43 to control water flow from water storage receptacle 30, and in some embodiments the flow rate from valve 42 may be adjusted (e.g. decreased and/or increased) depending on the desired amount of water to be dispensed therethrough. The duration of supplying water (e.g. gravity and/or pumped) from dispenser 20 may be manually and/or automatically started and/or ended by the refrigerator 10. The user may manually start and/or end the supplying of water, e.g., based upon a trigger and/or micro switch coupled to a paddle or button on door 12. In other embodiments dispensing (e.g. gravity, pump, and/or pressure) may be automated. For example, water may be dispensed and automatically ended upon a predetermined duration or volume being dispensed, e.g., as determined using the various techniques discussed in greater detail below. Moreover, in various embodiments, a time algorithm may be used to dispense a set amount of water before stopping. Valve 42 may also be electronically activated in some embodiments. Further, in some embodiments, valve 42 or user interface 19 may be child-resistant (e.g. push and turn) or have a lockout feature (e.g. button/switch) to reduce the likelihood of an unauthorized user (e.g. a child) from opening the valve and/or any undesired dispensing activity.

As noted above, a variety of water storage receptacles 30 may be positioned in a variety of positions within the refrigerator 10. In some embodiments, the water storage receptacle 30 may be a tank 32, conduit, and/or bladder, and in some embodiments, tank 32 may be blow-molded plastic or injection molded. If a bladder is used, the bladder may be rubber or other suitable materials that may collapse and/or expand based upon the volume of fluid contained within. If a conduit is used, the conduit may be a coiled hose, pipe, or cylinder structure. In some embodiments, a vent 34 may also be used in fluid commination with water storage receptacle 30. For example, vent 34 may be positioned at the top of tank 32, vented into one or more of the refrigerator compartments, vented within one or more doors, or vented to the exterior of the refrigerator, etc. Moreover, in some embodiments, vent 34 may include a backflow preventer to reduce or prevent water from escaping.

Figure 3:
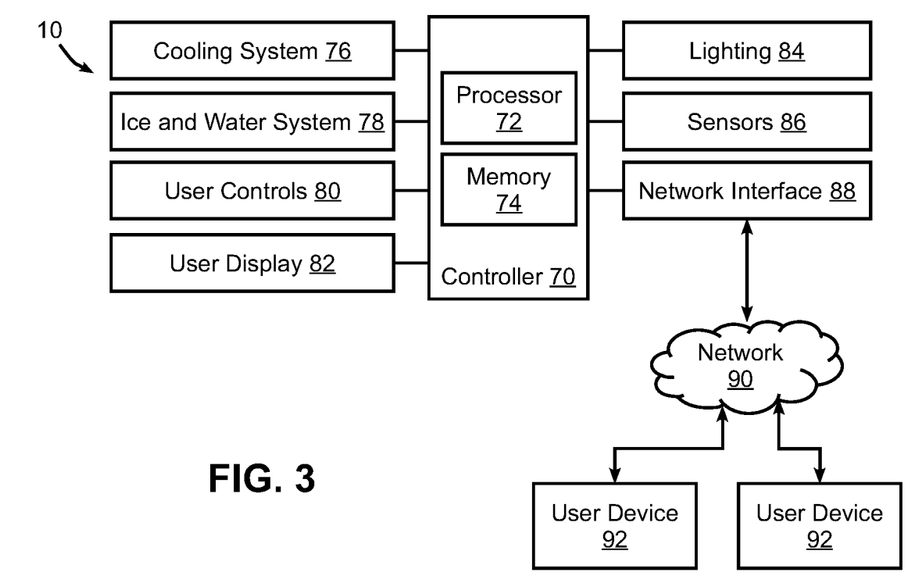
FIG. 3 is a block diagram of an example control system for the refrigerator of FIG. 1.

As shown in FIG. 3, refrigerator 10 may also include a controller 70 that may be interfaced with various components, including a cooling or refrigeration system 76, an ice and water system 78 (which may include, among additional ice making and dispensing components, the various components discussed above with respect to dispenser 20 of FIGS. 1-2), one or more user controls 80 for receiving user input (e.g., various combinations of switches, knobs, buttons, sliders, touchscreens or touch-sensitive displays, microphones or audio input devices, image capture devices, etc., including but not limited to control panel 18 and user interface 19), and one or more user displays 82 (including various indicators, graphical displays, textual displays, speakers, etc.), as well as various additional components suitable for use in a refrigerator, e.g., interior and/or exterior lighting 84, among others. User controls and/or user displays 80, 82 may be disposed, for example, on one or more control panels disposed in the interior and/or on doors and/or other external surfaces of the refrigerator. Further, in some embodiments audio feedback may be provided to a user via one or more speakers, and in some embodiments, user input may be received via a spoken or gesture-based interface. Additional user controls may also be provided elsewhere on refrigerator 10, e.g., within the fresh food and/or freezer compartments. In addition, refrigerator 10 may be controllable remotely, e.g., via a smartphone, tablet, personal digital assistant or other networked computing device, e.g., using a web interface or a dedicated app.

Controller 70 may also be interfaced with various sensors 86 located to sense environmental conditions inside of and/or external to refrigerator 10, e.g., one or more temperature sensors, humidity sensors, etc. Such sensors may be internal or external to refrigerator 10, and may be coupled wirelessly to controller 70 in some embodiments. Sensors 86 may also include additional types of sensors such as door switches, switches that sense when a portion of an ice dispenser has been removed, and other status sensors, as will become more apparent below.

In some embodiments, controller 70 may also be coupled to one or more network interfaces 88, e.g., for interfacing with external devices via wired and/or wireless networks such as Ethernet, Wi-Fi, Bluetooth, NFC, cellular and other suitable networks, collectively represented in FIG. 2 at 90. Network 90 may incorporate in some embodiments a home automation network, and various communication protocols may be supported, including various types of home automation communication protocols. In other embodiments, other wireless protocols, e.g., Wi-Fi or Bluetooth, may be used.

In some embodiments, refrigerator 10 may be interfaced with one or more user devices 92 over network 90, e.g., computers, tablets, smart phones, wearable devices, etc., and through which refrigerator 10 may be controlled and/or refrigerator 10 may provide user feedback.

In some embodiments, controller 70 may operate under the control of an operating system and may execute or otherwise rely upon various computer software applications, components, programs, objects, modules, data structures, etc. In addition, controller 70 may also incorporate hardware logic to implement some or all of the functionality disclosed herein. Further, in some embodiments, the sequences of operations performed by controller 70 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the refrigerator illustrated in FIGS. 1-3 will be apparent to one of ordinary skill in the art, as will become apparent from the description below. Therefore, the invention is not limited to the specific implementations discussed herein.

Refrigerator Fluid Dispenser with Dispensed Volume Calculation

Figure 4:
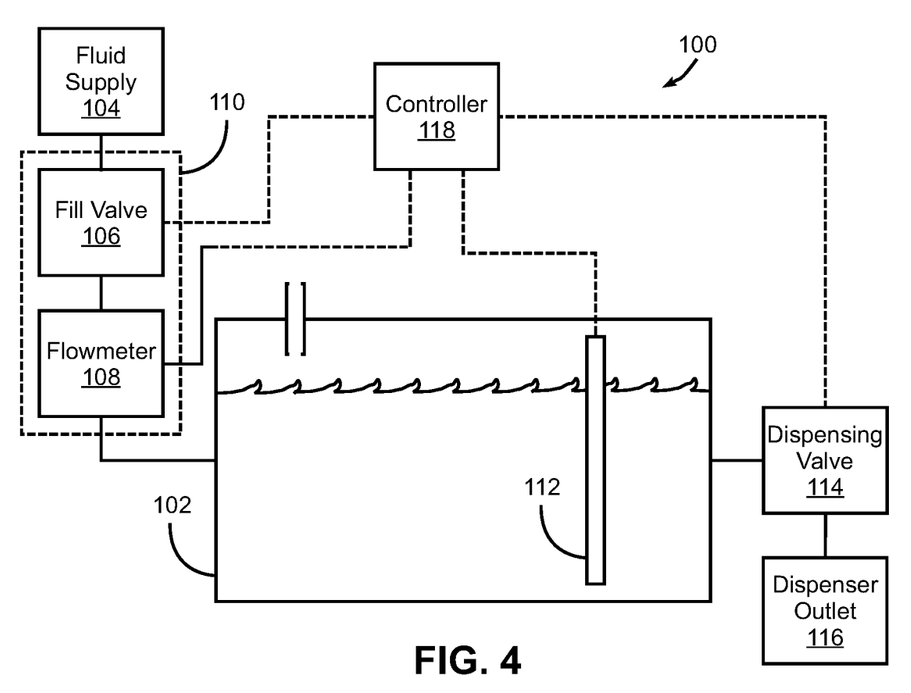
FIG. 4 is a block diagram of an example dispenser suitable for implementing volume determinations consistent with the invention.

Now turning to FIG. 4, this figure shows more generically a fluid dispensing system 100 suitable for use in a refrigerator such as refrigerator 10 of FIGS. 1-3, and incorporating dispensed volume calculation as described herein. Dispensing system 100 includes a fluid storage receptacle 102 having an inlet and an outlet, with the inlet coupled to a fluid supply 104 through a receptacle fill valve 106 in upstream fluid communication with the inlet of receptacle 102 to control a flow of fluid into the fluid storage receptacle and a flowmeter 108 in upstream fluid communication with the inlet of receptacle 102 to generate a signal representative of a volume of fluid entering receptacle 102. In some embodiments, valve 106 and flowmeter 108 may be separate components, while in other embodiments, and as illustrated by box 110, these components may be integrated with one another in the same housing.

A fluid level sensor 112, e.g., a conductivity sensor mounted on a wall of receptacle 102, an ultrasonic sensor positioned to sense a water surface within receptacle 102, or another suitable sensor, may be downstream of flowmeter 108 and positioned to generate a signal representative of a level of fluid in the receptacle, which as will be discussed in greater detail below, may also be used to represent a volume of fluid exiting the outlet of the fluid storage receptacle during dispensing. In addition, a dispensing valve 114 may be in downstream fluid communication with the outlet of fluid storage receptacle 102 to control dispensing of fluid from the fluid storage receptacle to a dispenser outlet 116.

Each of valves 106, 114 and sensors 108, 112 is additionally coupled to a controller 118 to enable the controller to control dispensing valve 114 to dispense fluid from fluid storage receptacle 102, to control fill valve 106 to fill receptacle 102, and to determine a volume of fluid dispensed through dispensing valve 114 using signals generated by sensors 108, 112.

In the illustrated embodiment, controller 118 may in particular determine a volume of fluid dispensed through dispensing valve 114 using a combination of signals output by flowmeter 108 and fluid level sensor 112, using the signal output by flowmeter 108 to determine or calculate a volume of fluid entering the fluid storage receptacle and using the signal output by fluid level sensor 112 to determine or calculate a change in fluid level in the fluid storage receptacle. In some embodiments, for example, volumes are primarily determined using fluid level sensor 112, with flowmeter 108 used to compensate or adjust the volumes determined using the fluid level sensor to account for the flow of additional fluid into the receptacle through receptacle fill valve 106 during dispensing. As such, in the event that dispensing is occurring when receptacle fill valve 106 is closed, the determined volume is based on the change in fluid level in the receptacle.

In particular, in some embodiments, the volume of fluid dispensed through dispensing valve 114 may be determined using the formula:

$$V_{OUT} = V_{IN} + V_{\Delta LEVEL}$$

where $V_{OUT}$ is the volume of fluid dispensed, $V_{IN}$ is the volume of fluid entering the fluid storage receptacle, and $V_{\Delta LEVEL}$ is the volume of fluid corresponding to the change in fluid level in the fluid storage receptacle. The volume of fluid corresponding to the change in fluid level may be based, for example, on a known geometry of the fluid storage receptacle, whereby the volume of fluid retained within the receptacle may be based upon the dimensions of the receptacle at different elevations. The volume may also be based upon empirically-determined volumes for different elevations in some embodiments. In some embodiments, for example, a lookup table may be used to store a volume corresponding to each of a plurality of levels such that a volume corresponding to a particular level sensed by fluid level sensor 112 may be retrieved from the lookup table, such that a volume corresponding to the change in fluid level may be determined by determining a difference between the volumes corresponding to a current fluid level and a previous fluid level.

The volume dispensed may be calculated over intervals during which the dispensing valve is open, and may be accumulated over a plurality of polling intervals while the dispensing valve is actuated. The accumulated volume may then be displayed to a user (e.g., via a door-mounted display, via a smartphone display, etc.) and/or used to control when the dispensing valve is deactivated and dispensing is discontinued, e.g., when dispensing a predetermined or controlled volume (e.g., as may be selected by a user via a door-mounted user control or via a smartphone control).

Figure 5:
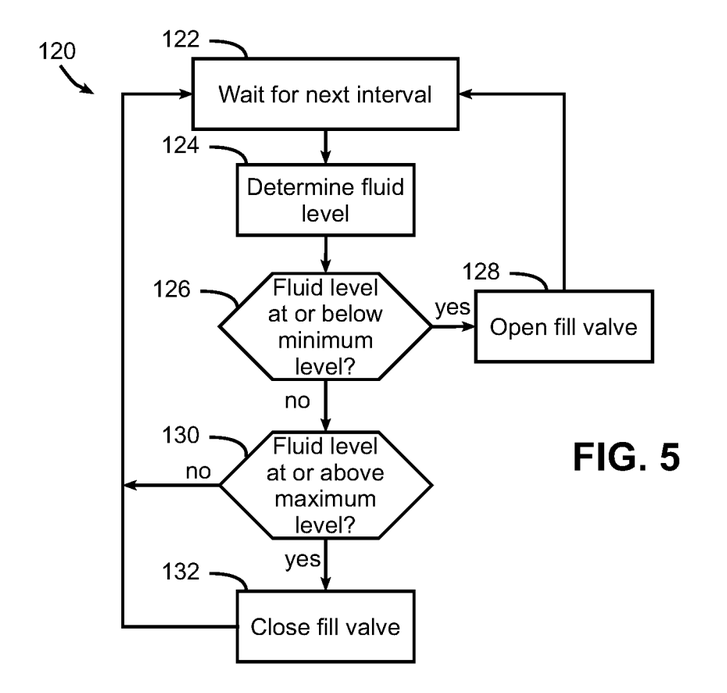
FIG. 5 is a flowchart illustrating a sequence of operations for automatically filling the receptacle referenced in FIG. 4.
Figure 6:
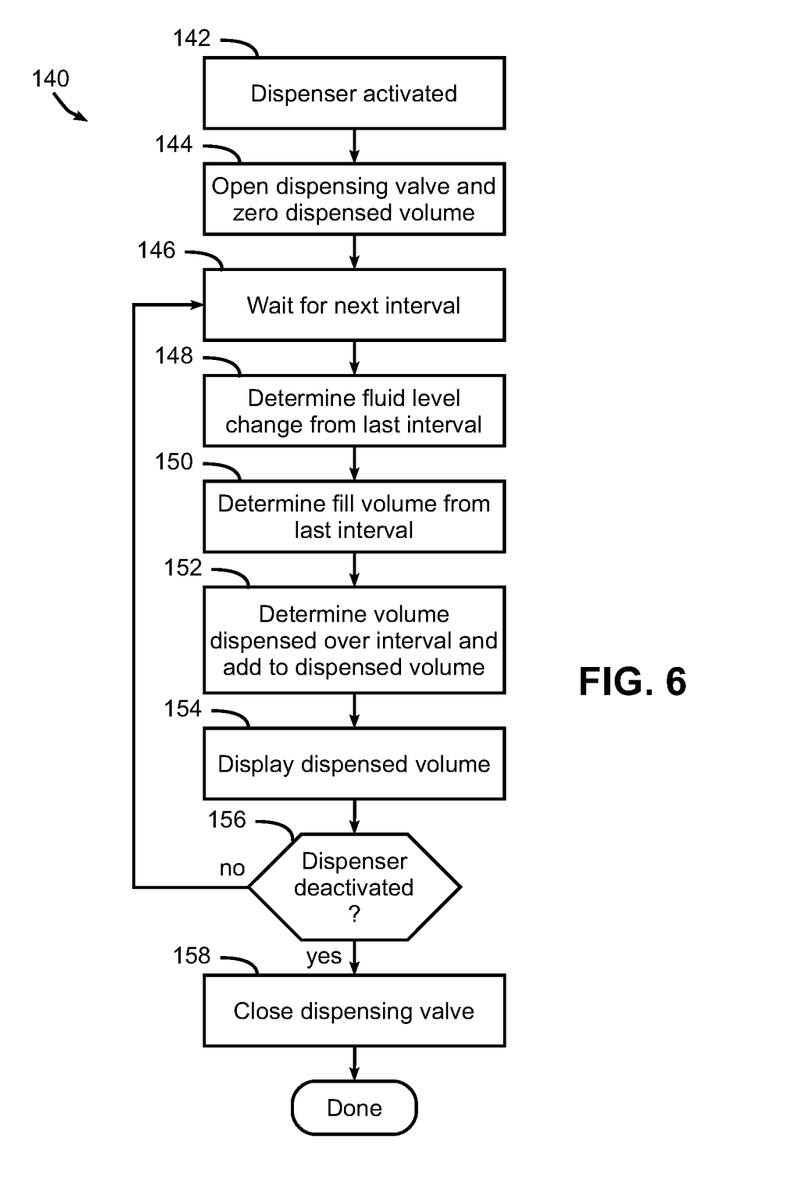
FIG. 6 is a flowchart illustrating a sequence of operations for performing a manual dispense using the dispensing system of FIG. 4.
Figure 7:
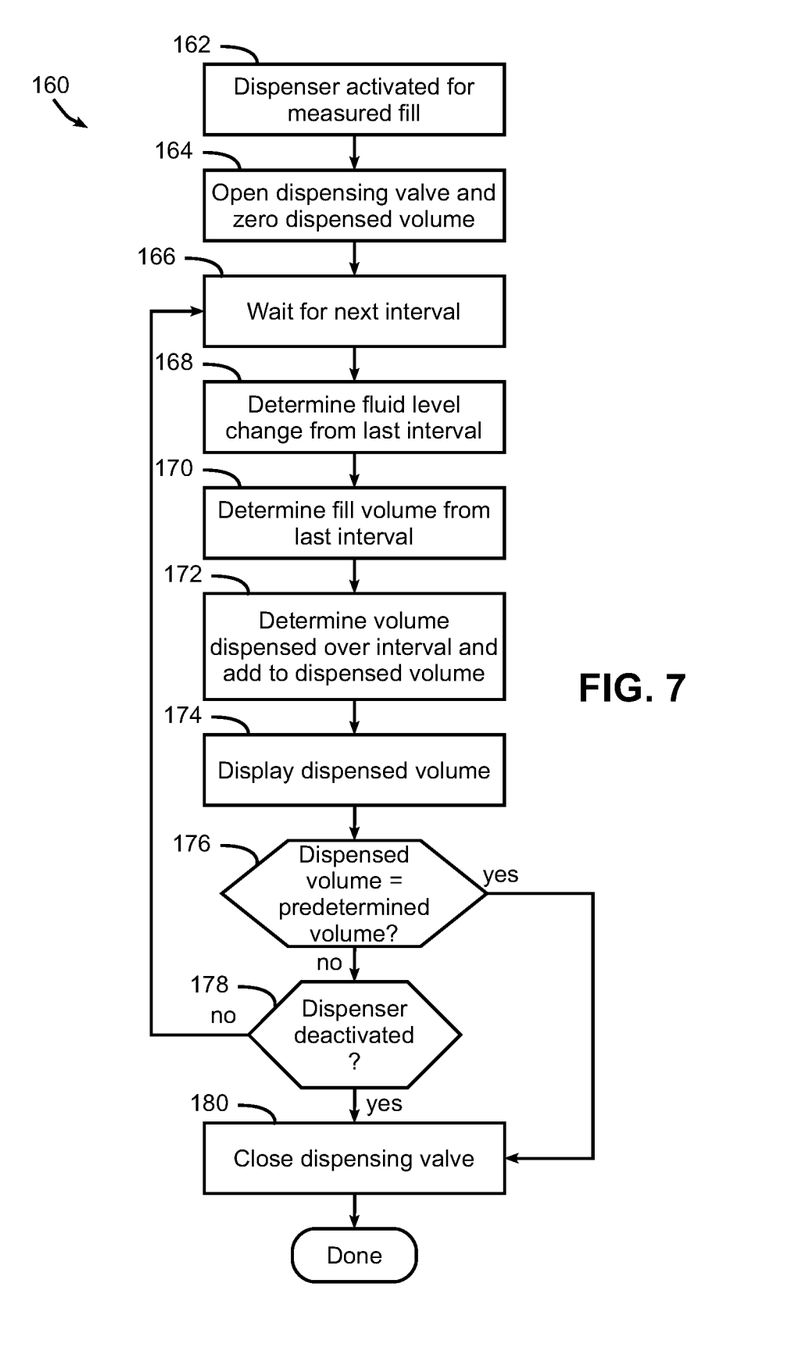
FIG. 7 is a flowchart illustrating a sequence of operations for performing a measured dispense using the dispensing system of FIG. 4.

FIGS. 5-7, for example, are flowcharts illustrating several routines that may be executed by a controller, e.g., controller 118 of dispensing system 100, to determine and utilize a determined volume of dispensed fluid. FIG. 5, for example, illustrates an example implementation of a fill valve control routine 120, which may be used to control fill valve 106 to maintain a desired level of fluid in fluid storage receptacle 102. During each of a plurality of polling intervals (block 122), routine 120 may determine a fluid level in receptacle 102 using fluid level sensor 112 (block 124). Block 126 may determine if the fluid level is at or below a minimum level set for the receptacle, and if so, pass control to block 128 to open fill valve 106, thereby introducing fluid into receptacle 102 from fluid supply 104. Control then returns to block 122 to wait for the next polling interval.

Returning to block 126, if the fluid level is not below the minimum level, block 130 next determines if the fluid level is at or above a maximum level set for the receptacle, indicating that the receptacle is full. If so, control passes to block 132 to close the fill valve, returning control to block 122 to wait for the next polling interval. And returning to block 130, if the fluid level is not above the maximum level, control returns directly to block 122. As such, routine 120 maintains the level of fluid within receptacle 102 between the minimum and maximum levels.

FIG. 6 next illustrates an example implementation of a manual dispense routine 140, which may be used to manually dispense fluid from dispensing system 100, e.g., in response to activation of the dispenser via selection of a button, paddle, or other user control (block 142). First, in block 144, dispensing valve 114 is opened and a dispensed volume variable is set to zero. Block 146 then initiates a loop to continuously dispense fluid and accumulate a total dispensed volume using the dispensed volume variable and over a plurality of polling intervals. For each interval, block 148 determines a fluid level change from the last interval using the signal output by fluid level sensor 112, e.g., by comparing a current fluid level sensed by sensor 112 with a fluid level sensed during the prior interval. Next, in block 150 a fill volume since the last interval is determined using the signal output by flowmeter 108, e.g., based upon a current flow rate multiplied by the length of the polling interval. Block 152 then determines a volume of fluid dispensed over the interval by summing together the fill volume since the last interval and a change in volume determined based upon the change in fluid level over the interval, and then adds the determined volume to the dispensed volume variable, thereby accumulating the determined volumes calculated for each interval. Block 154 next displays the current dispensed volume (e.g., on user interface 19, or on a smartphone display).

Block 156 next determines if the dispenser has been deactivated (e.g., by a user discontinuing depression of a button or a paddle), and if not, returns control to block 146 to wait for the next polling interval. If so, however, block 156 passes control to block 158 to close the dispensing valve, and routine 140 is complete.

FIG. 7 next illustrates an example implementation of a measured dispense routine 160, which may be used to dispense fluid a predetermined amount of fluid from dispensing system 100, e.g., in response to user selection of a predetermined amount in combination with activation of the dispenser via selection of a button, paddle, or other user control (block 162). Blocks 164-174 operate in a similar manner to blocks 144-154 of routine 140. First, in block 164, dispensing valve 114 is opened and a dispensed volume variable is set to zero. Block 166 then initiates a loop to continuously dispense fluid and accumulate a total dispensed volume using the dispensed volume variable and over a plurality of polling intervals. For each interval, block 168 determines a fluid level change from the last interval using the signal output by fluid level sensor 112, e.g., by comparing a current fluid level sensed by sensor 112 with a fluid level sensed during the prior interval. Next, in block 170 a fill volume since the last interval is determined using the signal output by flowmeter 108, e.g., based upon a current flow rate multiplied by the length of the polling interval. Block 172 then determines a volume of fluid dispensed over the interval by summing together the fill volume since the last interval and a change in volume determined based upon the change in fluid level over the interval, and then adds the determined volume to the dispensed volume variable, thereby accumulating the determined volumes calculated for each interval. Block 174 next displays the current dispensed volume (e.g., on user interface 19, or on a smartphone display).

Block 176 next determines if the dispensed volume equals (or exceeds) the predetermined volume for the measured fill, and if not, passes control to block 178 to determine if the dispenser has been prematurely deactivated (e.g., by a user discontinuing depression of a button or a paddle). If not, block 178 returns control to block 166 to wait for the next polling interval. If, however, either the predetermined volume has been reached, or the dispenser has be prematurely deactivated, control passes to block 180 to close the dispensing valve, and routine 160 is complete.

It will be appreciated that whenever the level of fluid in receptacle 102 is above the minimum level that activates the fill valve as discussed above in connection with routine 120 of FIG. 5, the fill volume determined in block 150 of routine 140 and in block 170 of routine 160 will generally be zero, as no fluid will be flowing through flowmeter 108. Thus, the calculation of the volume dispensed over the interval in each of blocks 152 and 172 of routines 140 and 160 will equal the volume based upon the change in fluid level as sensed by fluid level sensor 108. It is only when the level of fluid in the receptacle drops below the minimum level and fill valve 106 is activated that the fill volume sensed by flowmeter 108 is incorporated into the dispensed volume calculation, and as such, the fill volume serves as an adjustment factor for the fluid level sensor to account for the fact that the fluid entering the receptacle causes the level in the receptacle to drop less than would occur if fill valve 106 was closed.

By doing so, and particularly with regard to dispensing fluids in connection with vented fluid storage receptacles, controller 118 need not base calculations on a closed loop system whereby the volume of fluid entering the receptacle equals the volume of fluid exiting the receptacle. Separate determinations may instead be made of the volume of fluid entering and exiting the receptacle and combined to determine the volume of fluid dispensed by the dispenser. As such, particularly in situations where the total volume of fluid dispensed exceeds the capacity of the fluid storage receptacle, an accurate determination of volume of dispensed fluid may be dispensed even as additional fluid is being introduced into the receptacle during dispensing.

Various modifications may be made to the illustrated embodiments without departing from the spirit and scope of the invention. For example, in some embodiments a flowmeter or other sensor for determining the volume of water entering a receptacle may be omitted, and volume calculations may be performed solely using a water level sensor disposed within the water storage receptacle. Other modifications will be apparent to those of ordinary skill having the benefit of the instant disclosure.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

What is claimed is:

1. A refrigerator, comprising:
a housing including a freezer compartment and a fresh food compartment;
one or more doors attached to the housing to provide access to the freezer and fresh food compartments;
a water storage receptacle having an inlet and an outlet;
a receptacle fill valve in upstream fluid communication with the inlet of the water storage receptacle to control a flow of water into the water storage receptacle;
a dispensing valve in downstream fluid communication with the outlet of the water storage receptacle to control dispensing of water from the water storage receptacle;
a flowmeter in upstream fluid communication with the inlet of the water storage receptacle to generate a first signal representative of a volume of water entering the water storage receptacle;
a water level sensor positioned to generate a second signal representative of a level of water in the water storage receptacle; and
a controller coupled to the dispensing valve, the flowmeter, and the water level sensor and configured to control the dispensing valve to dispense water from the water storage receptacle and to determine a volume of water dispensed through the dispensing valve using the first and second signals.

2. A refrigerator, comprising:
a housing defining at least one food compartment;
at least one door attached to the housing;
a fluid storage receptacle having an inlet and an outlet;
a dispensing valve in downstream fluid communication with the outlet of the fluid storage receptacle to control dispensing of fluid from the fluid storage receptacle;
a first sensor in upstream fluid communication with the inlet of the fluid storage receptacle to generate a first signal representative of a volume of fluid entering the fluid storage receptacle;
a second sensor disposed downstream of the first sensor to generate a second signal representative of a volume of fluid exiting the outlet of the fluid storage receptacle; and
a controller coupled to the dispensing valve, the first sensor, and the second sensor and configured to control the dispensing valve to dispense fluid from the fluid storage receptacle and to determine a volume of fluid dispensed through the dispensing valve using the first and second signals.

3. The appliance of claim 2, wherein the first sensor comprises a flowmeter.

4. The appliance of claim 3, wherein the flowmeter is integrated with a receptacle fill valve in upstream fluid communication with the inlet of the fluid storage receptacle to control a flow of fluid into the fluid storage receptacle.

5. The appliance of claim 2, wherein the second sensor comprises a fluid level sensor positioned to sense a level of fluid in the fluid storage receptacle.

6. The appliance of claim 5, wherein the fluid level sensor comprises an ultrasonic sensor positioned to detect a distance to a fluid surface in the fluid storage receptacle or a conductivity sensor disposed on a wall of the fluid storage container.

7. The appliance of claim 5, further comprising a receptacle fill valve in upstream fluid communication with the inlet of the fluid storage receptacle to control a flow of fluid into the fluid storage receptacle.

8. The appliance of claim 7, wherein the controller is configured to determine the volume of fluid dispensed through the dispensing valve at least in part by determining a change in fluid level in the fluid storage receptacle using the second signal.

9. The appliance of claim 8, wherein the controller is configured to determine the volume of fluid dispensed through the dispensing valve at least in part by determining a volume of fluid entering the fluid storage receptacle using the first signal.

10. The appliance of claim 9, wherein the controller is configured to determine the volume of fluid dispensed through the dispensing valve using the formula:

$$V_{OUT} = V_{IN} + V_{\Delta LEVEL}$$

where $V_{OUT}$ is the volume of fluid dispensed, $V_{IN}$ is the volume of fluid entering the fluid storage receptacle, and $V_{\Delta LEVEL}$ is the volume of fluid corresponding to the change in fluid level in the fluid storage receptacle.

11. The appliance of claim 10, wherein the controller is configured to accumulate the volume of fluid dispensed over a plurality of polling intervals when the dispensing valve is actuated to dispense fluid from the fluid storage receptacle.

12. The appliance of claim 2, wherein the fluid storage receptacle is vented.

13. The appliance of claim 2, wherein the controller is further configured to cause the determined volume of water dispensed through the dispensing valve to be displayed on a display disposed on one of the housing and the at least one door.

14. The appliance of claim 2, wherein the controller is further configured to control the dispensing valve to discontinue dispensing fluid when the determined volume of water dispensed through the dispensing valve reaches a predetermined volume.

15. The appliance of claim 14, wherein the controller is configured to set the predetermined volume in response to user input.

16. The appliance of claim 2, further comprising a fluid dispensing control disposed on one of the housing and the at least one door, wherein the controller is configured to control the dispensing valve responsive to user input received by the fluid dispensing control.

17. A refrigerator, comprising:
a housing including a freezer compartment and a fresh food compartment;

one or more doors attached to the housing to provide access to the freezer and fresh food compartments;

a water storage receptacle having an inlet and an outlet, wherein the inlet is in fluid communication with a water supply;

a dispensing valve in downstream fluid communication with the outlet of the water storage receptacle to control dispensing of water from the water storage receptacle;

a water level sensor positioned to generate a signal representative of a level of water in the water storage receptacle; and a controller coupled to the dispensing valve and the water level sensor and configured to control the dispensing valve to dispense water from the water storage receptacle and to determine a volume of water dispensed through the dispensing valve based at least in part upon a change in the level of water in the water storage receptacle determined from the signal representative of the level of water generated by the water level sensor.

18. A method of dispensing water in a refrigerator, comprising:

actuating a dispensing valve in downstream fluid communication with an outlet of a water storage receptacle to control dispensing of water from the water storage receptacle;

with a first sensor in upstream fluid communication with an inlet of the water storage receptacle, generating a first signal representative of a volume of water entering the water storage receptacle;

with a second sensor disposed downstream of the first sensor, generating a second signal representative of a volume of water exiting the outlet of the water storage receptacle; and with a controller, determining a volume of water dispensed through the dispensing valve using the first and second signals.

19. The method of claim 18, wherein the first sensor comprises a flowmeter and the second sensor comprises a water level sensor positioned to sense a level of water in the water storage receptacle.

20. The method of claim 19, further comprising selectively actuating a receptacle fill valve in upstream fluid communication with the inlet of the water storage receptacle to control a flow of water into the water storage receptacle in response to determining from the second sensor that a water level in the water storage receptacle is below a fill threshold.

21. The method of claim 19, wherein determining the volume of water dispensed through the dispensing valve includes:

determining a change in water level in the water storage receptacle using the second signal;

determining a volume of water entering the water storage receptacle using the first signal; and determining the volume of water dispensed through the dispensing valve using the determined change in water level in the water storage receptacle and the determined volume of water entering the water storage receptacle.

22. The method of claim 21, wherein determining the volume of water dispensed through the dispensing valve further includes accumulating the volume of water dispensed over a plurality of polling intervals when the dispensing valve is actuated to dispense water from the water storage receptacle.

23. The method of claim 18, further comprising displaying the determined volume of water dispensed through the dispensing valve on a display disposed on one of a housing and a door of the refrigerator.

24. The method of claim 18, further comprising controlling the dispensing valve to discontinue dispensing fluid when the determined volume of water dispensed through the dispensing valve reaches a predetermined volume.

25. The method of claim 18, wherein determining the volume of water dispensed through the dispensing valve using the first and second signals includes determining the volume of water dispensed after a volume of water exceeding a capacity of the fluid storage receptacle has been dispensed.

* * * * *